Figure 4A:
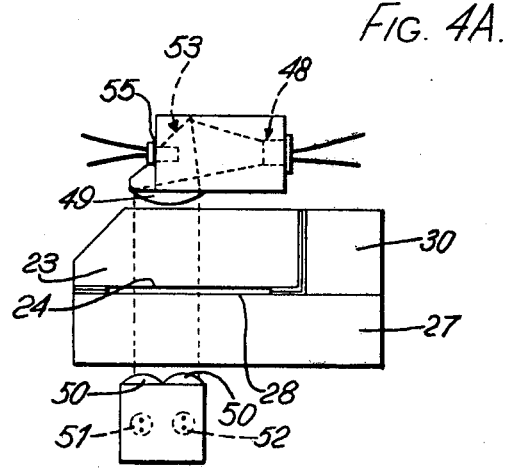

United States Patent [19]

Fisher et al.

[11] 4,215,480
[45] Aug. 5, 1980

[54] DISTANCE MEASURING GAUGE

[75] Inventors: John H. Fisher; John D. Bradbrook, both of Royston; Peter J. Bassett, Foxton Near Royston, all of England

[73] Assignee: James Neill Holdings Limited, England

[21] Appl. No.: 861,495

[22] Filed: Dec. 16, 1977

Related U.S. Application Data

[63] Continuation of Ser. No. 674,987, Apr. 8, 1976, abandoned.

[51] Int. Cl.² ............................................. G01B 9/00
[52] U.S. Cl. .................................................. 33/125 C
[58] Field of Search ............ 33/125 C, 125 A, 143 L, 33/143 N, 166; 356/169, 374; 250/237 G

[56] References Cited

U.S. PATENT DOCUMENTS

| | | | |
|---|---|---|---|
| 2,604,004 | 7/1952 | Root | 33/143 L X |
| 2,886,717 | 5/1959 | Williamson et al. | 33/125 C X |
| 3,184,855 | 5/1965 | Sebastiani | 33/147 N |
| 3,243,692 | 3/1966 | Heissmeier | 33/125 C X |
| 3,588,462 | 6/1971 | Breckel | 356/169 X |
| 3,665,743 | 5/1972 | Frohling | 33/143 L X |
| 3,738,753 | 6/1973 | Huntley | 356/169 X |
| 3,755,909 | 9/1973 | Asano et al. | 33/143 L |
| 3,816,003 | 6/1974 | Litke | 33/125 C X |
| 3,833,303 | 9/1974 | Burns et al. | 356/169 |
| 3,867,037 | 2/1975 | Litke | 33/125 C X |
| 4,039,826 | 8/1977 | Wingate | 250/237 G |
| 4,136,958 | 1/1979 | Nelle | 250/237 G |

*Primary Examiner*—Charles E. Phillips
*Attorney, Agent, or Firm*—Cesari and McKenna

[57] ABSTRACT

A hand held digital read-out measuring instrument in which interference fringes are generated by the transmission of radiations through gratings which move relative to one another according to a distance being measured and the fringes are counted to detect changes in the fringe pattern and generate a pulse output related to the distance, means being provided to control the rate of movement and to exert a substantially constant force on the movable elements.

8 Claims, 16 Drawing Figures

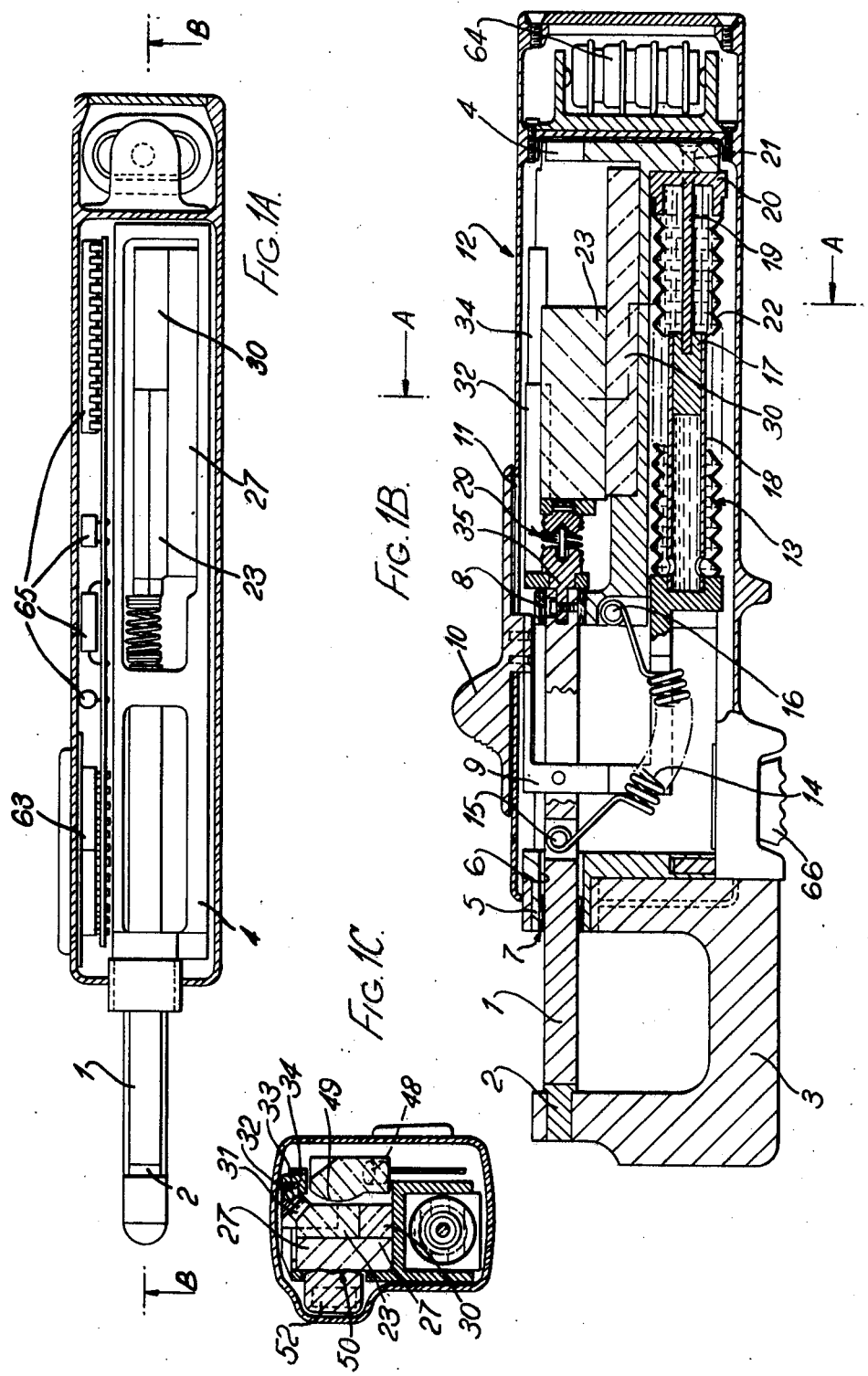

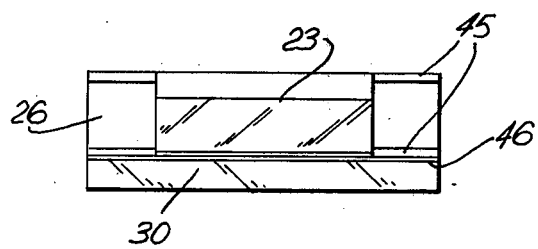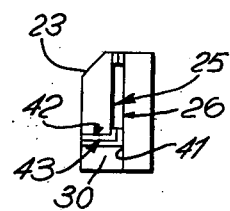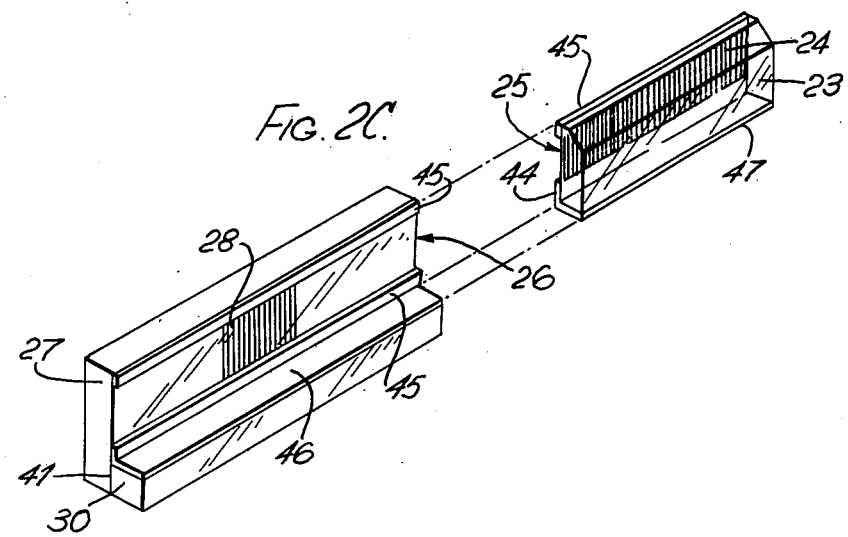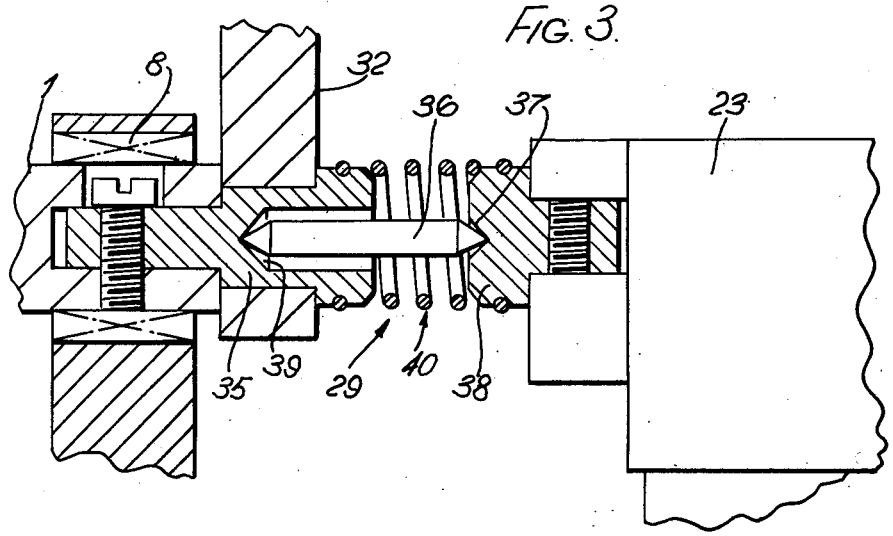

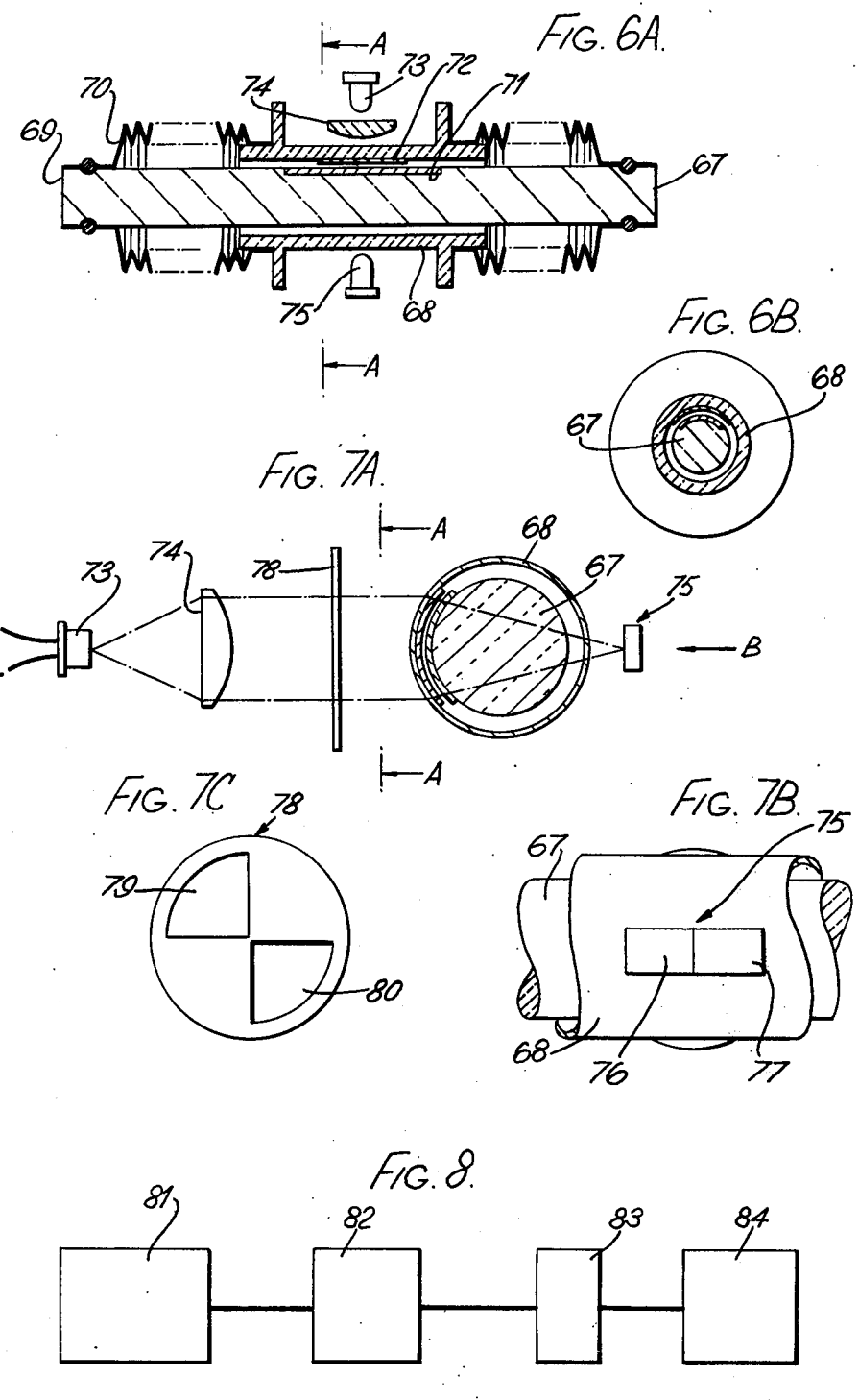

DISTANCE MEASURING GAUGE

This is a continuation of application Ser. No. 674,987, filed Apr. 8, 1976, now abandoned.

This invention relates to measuring apparatus. The apparatus of the invention can be used, for example, to measure a dimension of an object or a distance by which an object moves.

The dimension or distance is measured by counting the number of fringes of an interference pattern that passes a given point during the movement of a grating with respect to another grating.

The history of the use of gratings in measuring apparatus is traced in a review article in the Journal of Physics E:Scientific Instruments for Mar. 1972 Volume 5 No. 3 pages 193–198, published by the Institute of Physics, London, England and entitled Gratings in Metrology.

Known measuring apparatus employing interference patterns are both bulky and expensive.

To some extent this is due to the difficulties experienced in manufacturing and copying accurate gratings having fine resolution characteristics. The difficulties experienced in making an accurate master grating, from which gratings to be used in measuring apparatus can be derived, are explained in the review article referred to above. Partly as a result of these difficulties, it is the common practice in such known measuring apparatus to use gratings having a 10 micron period and to employ analog electronic division techniques to obtain a measuring resolution of 1 or 2 microns, as required.

One aspect of the present invention is concerned with the provision of an improved method for making a master grating.

Another aspect of the present invention is concerned with the provision of a measuring apparatus that is small enough to be held in the hand, that is self-contained and that can operate without connection to any additional apparatus or separate power supplies. It will be appreciated, however, that the invention is not limited to use with hand held apparatus, but that it can be applied to other measuring apparatus, for example bench mounted apparatus.

The present invention has a plurality of features, apart from the use of an improved method of making a master grating referred to above, that contribute to a reduction in the bulk and the cost of the apparatus, thereby enabling, for example, a self-contained hand held apparatus to be made.

A further feature of the invention is the use, in the counting of the fringes of an interference pattern, of an electrical circuit that is comparatively simple.

In a preferred embodiment of the invention, a circuit is used that requires only four pulses per cycle of the fringes to be generated and these pulses are generated from the signals obtained from two or more detectors using well known electronic techniques, for example the techniques described in the specification of United Kingdom Pat. No. 760,321.

In the preferred embodiment of the invention, in order to achieve a resolution of 1 micron, the period of the gratings used to generate the fringes is as small as 4 microns.

Yet a further feature of the invention, which features enables the contrast between the modulated signal output from the detectors and the unmodulated background noise to be as high as possible, is concerned with the provision of mounting means which enable the two gratings, which are to be moved relatively to one another, to be as close as possible to one another. This requirement is particularly necessary with gratings having a period as small as 4 microns. In the preferred embodiment of the invention the spacing between the gratings is no more than 12 microns, although it is possible to operate the system with a spacing between the gratings of up to 20 microns.

In a particular embodiment of the invention to be described below in more detail, the invention is employed with a hand held micrometer and the embodiment to be described has the particular advantage over the conventional screw threaded instrument that measurements can be taken much more quickly. One reason for this is that the device to be described employs an instantaneous digital readout of the relative positions of the spindle of the instrument with reference to an anvil and has a spindle which can be slid directly to the position required, whereas it can take as long as 20 seconds to move the spindle of a conventional instrument employing a screw to the fully open position.

A further feature of the invention, one example of which is to be described with reference to the particular embodiment, is the use of a system which exerts a substantially constant force to urge the spindle against the anvil, thereby ensuring that a force of the same value is consistently exerted upon an object being measured between the anvil and the spindle.

Yet another feature of the invention is the provision of a damper system that controls the speed at which the spindle slides and thus the rate at which pulse signals are applied to a pulse counting circuit.

Figure 4B:
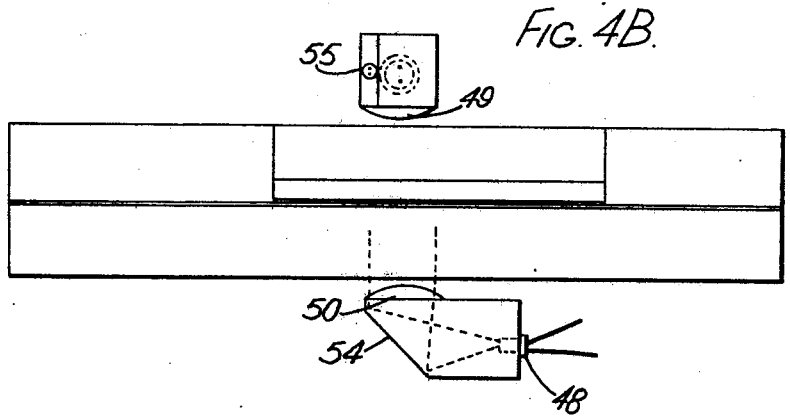
Figure 5:
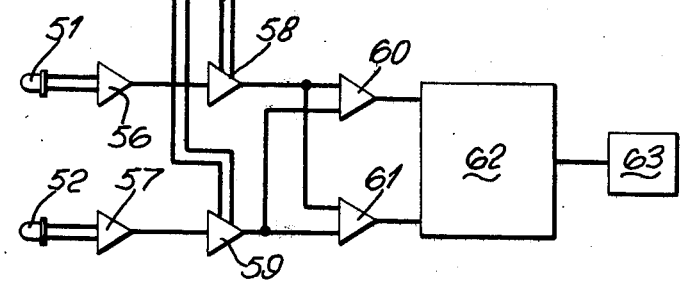

Embodiments of the invention will now be described, by way of example, with reference to the accompanying drawings wherein like parts are indicated by the same reference numerals and in which:

FIG. 1A, FIG. 1B and FIG. 1C are a partly cut-away plan view, a longitudinal section on the line B—B of FIG. 1A, and a cross section on the line A—A of FIG. 1B respectively of a hand-held micrometer gauge, FIG. 2A, FIG. 2B and FIG. 2C are a side elevation, an end elevation and an exploded perspective view of a glass measuring block arrangement, FIG. 3 is a longitudinal section through a coupling unit used in the gauge, FIG. 4A and FIG. 4B are end and plan views respectively of the glass measuring block arrangement showing an associated radiation emitter and receiver arrangement, FIG. 5 is a block schematic circuit diagram, FIG. 6A and FIG. 6B are a longitudinal section and a cross section on the line A—A of FIG. 6A of a grating and damper assembly, FIG. 7A, FIG. 7B and FIG. 7C are a diagrammatic cross sectional view of the arrangement shown in FIGS. 6A and 6B, together with a mask system, a view on the line A—A of FIG. 7A and a view in the direction of the arrow B of the arrangement shown in FIG. 7A respectively and FIG. 8 is a flow chart illustrating the steps in the making of a master grating.

Referring now to the drawings, there is shown in FIGS. 1A, 1B and 1C a hand-held measuring gauge having a spindle 1 which constitutes a first measuring member and which is arranged to slide towards and away from a measuring head or anvil 2 located on a jaw frame 3. The anvil 2 and the adjacent end of the spindle 1 form jaws, in a similar manner to the jaws of known micrometer screw gauges.

The gauge has a main frame 4 which together with jaw frame 3 and anvil 2 constitutes a second measuring member, and from which a bearing holder 5 extends around the spindle 1. The jaw frame 3, which extends around the bearing holder 5 is attached to the frame 4 by means of glue and a key 6. The bearing holder 5 carries a bearing 7 which provides a bearing surface for the spindle 1. A second bearing surface 8 for the spindle 1 is located in the main frame 4. A first part of an arm 9 is connected between the spindle 1 and a sliding retraction button 10. The said first part of the arm 9 extends through a slot 11 in a case 12. A second part of the arm 9 is connected between the spindle 1 and a damper assembly 13. A "flexator" coil spring 14 is connected between a location pin 15 on the spindle 1 and a location pin 16 on the frame 4. There may be more than one such "flexator" spring. A "flexator" spring is a tension coil spring arranged so that it operates in a flexing mode. In this manner a substantially constant bias force is exerted between the pins 15 and 16 in order to urge the spindle 1 towards the anvil 2. The force will be exerted upon the spindle 1 even when the spindle 1 is positioned against the anvil 2. Other means can, of course, be used to urge the spindle 1 towards the anvil 2.

The damper 13 includes a piston 17 within a body 18. The damper body 18 is attached to the arm 9 and the piston 17 is coupled, via a flexible rod 19, to an end cap 20. The end cap 20 is attached by a screw 21 to the main frame 4. The damper assembly further includes sealed bellows 22 and is filled with a viscous fluid.

When the body 18 moves relatively to the piston 17, which slides within it, a restraining or drag force is exerted between the piston 17 and the body 18 due to the presence of the viscous fluid, thereby limiting the speed at which the spindle 1 is able to slide in the bearings 7 and 8. The spindle 1 is urged to move towards the anvil 2 by the "flexator" spring 14, which has a rate which is approximately zero. To open the jaws, the spindle 1 is caused to slide in the bearings 7 and 8 by an operator sliding the button 10, which is coupled via the first part of the arm 9 to the spindle 1, along the casing 12.

As may also be seen more clearly with reference to FIGS. 2A, 2B and 2C, the gauge includes a glass block or prism 23 which carries an optical grating 24 on a surface 25, the surface 25 being adjacent to a surface 26 of a second glass block or prism 27 which is fixed to the frame 4. The surface 26 carries a second optical grating 28 and the block 23 is arranged to slide adjacent the block 27, the block 23 being coupled via a coupling unit 29 to the spindle 1. The sliding block 23 has a bevelled face via which the block is urged against the back or reference block 27 and a glass base block or prism 30 by a leaf spring 31 (FIG. 1C), which is retained by two location pins (not shown) against an arm 32. This ensures that intimate contact is maintained between the block 23 which constitutes the first of the two measurement providing members and the blocks 27 and 30. The arm 32 transfers the reaction force of the spring 31 via a ball arrangement 33 to a strip of low friction material 34, which is attached to an extension of the main frame 4. The arm 32 is connected to the spindle 1 in such a way that it is free to rotate about the spindle with a minimum amount of orthogonal movement. This is achieved, as may more clearly be seen by reference to FIG. 3, by employing a bearing member 35 which passes through a hole in the arm 32, is attached to the end of the spindle 1, and provides one end of the coupling unit 29.

The coupling unit 29, as may be more clearly seen from FIG. 3, includes a pin 36 having a conical portion at one end which is inserted into a conical socket 37 in a member 38, the member 38 being coupled, as indicated, to the sliding glass block 23. At its other end, the pin 36 has a conical portion which locates in a conical socket 39 in the bearing member 35. The conical sockets 37 and 39 define included angles which are greater than those of the conical end portions of the pin 36. The members 35 and 38 are coupled together flexibly by means of a coil spring 40 which is under tension and which holds the pin 36 in place between the sockets 37 and 39. It will be seen that the coupling unit 29 is so designed that, while it constrains the sliding block 23 to move directly in accordance with the movement of the spindle 1 along its longitudinal axis, it allows a degree of linear and rotational movement of the block 23 in other directions, thereby enabling wear and variations due to manufacturing tolerances to be taken up. The coupling unit 29 is thus a universal coupling which permits 5 degrees of freedom.

The construction and disposition of the glass blocks 23, 27 and 30 will now be described in more detail, particularly with reference to FIGS. 2A, 2B and 2C. It will be appreciated that, although transparent glass blocks are used, other combinations of mechanically stable transparent materials, or transparent and reflective materials could be used.

The material for the blocks 23, 27 and 30 is first selected and then machined and/or polished to provide smooth rectangular surfaces. The gratings 24 and 28 are line and space gratings and are printed on the surfaces 25 and 26 using standard photo-mechanical techniques and employing optically opaque thin films. In the preferred embodiment the period of the gratings is chosen to be 4 microns. Other periods could, of course, be used. The gratings 24 and 28 are produced by coating the surfaces 25 and 26 of the blocks 23 and 27 in a vacuum with a chromium film. A film of photo-resist material is then applied to the chromium film. The film of photo-resist material is then exposed by means of ultra-violet light to an image of a master grating. The parts of the resist material which have been exposed to ultra-violet light are more soluble in a "developer" than are the unexposed parts, with the result that, upon the development of the coating, the areas of the layers of chromium that are not required are exposed. The exposed areas of chromium are then etched away and an image of the original master grating is obtained. Similar techniques are well known in the manufacture of printed circuits.

A method of making a master grating will be described below with reference to FIG. 8.

The lines of the gratings 24 and 28 are produced on the surfaces 25 and 26 in such a way that they are substantially perpendicular to the longitudinal edges of the surfaces 25 and 26 respectively.

In assembling the blocks, it is important that the base block 30 be fixed accurately to the back or reference block 27 and that its face 41 and the face 26 of the reference block 27 should both be flat. It is also important that, when the glass blocks 23, 27 and 30 are assembled together as a unit, the slider block 23 should fit accurately into the angle between the base block 30 and the reference block 27. This is most conveniently achieved by ensuring that the face 42 of the sliding block 23 and the face 43 of the base block 30 to which it is adjacent are perpendicular to the surface 25 of the sliding block 23 which carries the grating 24. The surfaces 25 of the sliding block 23 is, of course, arranged to be flat.

It is not necessary for the gratings 24 and 28 to extend to the longitudinal edges of the blocks 23 and 27 and, in order to provide low friction sliding surfaces and to space the gratings thereby reducing the possibility of the gratings becoming worn during use, the surfaces 25 and 26 of the blocks 23 and 27 are provided with spacer rails 44 and 45 respectively along the edges of the blocks. The rails 44 and 45 are suitably between 1 and 10 microns thick. In the preferred embodiment the rails are 4 microns thick. Thin spacer layers 46 and 47 on the surfaces 43 and 42 of the blocks 30 and 23 respectively space the blocks 30 and 23 and provide low friction sliding surfaces. In the particular embodiment, the spacer rails 44 and 45 and the surfaces 46 and 47 are thin coatings of PTFE applied by a spraying process. Other solid lubricant materials, for example molybdenum disulphide, tungsten diselenide or carbon may be used. These materials can be applied either by spraying or by a vacuum deposition process.

In order to improve the adhesion of the sprayed on rails 44 and 45 and the layers 46 and 47, it is advantageous to roughen the surfaces of the glass blocks locally, for example by etching or shot blasting, before the lubricant material is applied.

Other methods of spacing and lubricating the blocks can be used. For example an oil film can be used between the surfaces 25 and 26 to provide lubrication and the spacing between the blocks can be obtained by using vacuum deposited metal spacer rails. Alternatively the block 23 can be maintained between two films of oil of approximately equal thickness which are constrained by the block 27 and an additional smilar block on the other side of the block 23.

To assemble the blocks 23, 27 and 30 in proper working relationship, they are arranged in a jig in which they are aligned as required. The angle between the gratings 24 and 28 is adjusted by tilting the base block 30 until fringes of the required period are generated between the two gratings. In the preferred embodiment a fringe period of about 12 millimeters is chosen. An anaerobic or ultra-violet light curing cement is then introduced by capillary or other action between the side surface 26 of the back or reference block 27 and the edge surface 41 of the base block 30 which is in contact with a part of the surface 26 and the cement is cured, thereby holding the two blocks together at the correct angle and in L-shaped configuration. It will be appreciated that other types of cement or other methods of securing the blocks together can be used.

The arrangement of the glass blocks 23, 27 and 30 and radiation transmitting and detecting devices will now be described, particularly with reference to FIGS. 4A and 4B which show a source of radiations, in the form of a lamp 48, arranged to direct a beam of radiations via a lens 49, the sliding block 23, the gratings 24 and 28, the reference block 27 and a lens arrangement 50, to an array of photo-sensitive detector devices 51 and 52. The photo-sensitive devices 51 and 52 are spaced in a perpendicular direction to the fringe pattern generated by the passage of radiations from the source 48 through the gratings 24 and 28. The devices 51 and 52 detect movements in the fringe pattern due to relative longitudinal movement between the blocks 23 and 27 and the consequent movement between the gratings 24 and 28. In the particular embodiment being described the devices 51 and 52 are silicon photo transistors and are spaced apart by one quarter of the period of the fringe pattern, so that on relative movement between the gratings 24 and 28, output signals are obtained from the photo-transistors 51 and 52 which are approximately sinusoidal and have a relative phase difference of approximately 90°. In the particular embodiment being described, the lamp 48 is an infra-red light emitting diode, and the beam of radiation from the lamp 48 is deflected by means of mirrors 53 and 54 in order to enable the width of the instrument to be reduced while maintaining the path of the radiations. It is, of course, possible to use other sources of radiation and other radiation detectors. A further photo-sensitive device 55, which in the particular embodiment is a photo-transistor, is used to monitor the output from the lamp 48 and thus give a signal which is used to adjust a circuit and compensate for variations in voltage from the power supply or due to ageing of the lamp.

Reference will now be made to FIG. 5, which shows the output from the photo-transistors 51 and 52 applied to respective amplifiers 56 and 57 whose outputs are then squared during amplification in further respective circuits 58 and 59. The outputs from the circuits 58 and 59 are maintained symmetrical about a voltage level which is adjusted in accordance with changes in a d.c. output signal from the reference photo-detector 55. Ideally, the outputs from the amplifiers 58 and 59 are square waves in quadrature. The outputs from the amplifiers 58 and 59 are both applied to a detector 60, which provides a pulse output for every amplitude transition of both square waves, and a phase detector 61. A pulse is obtained from the detector 60 for every quarter of a cycle of the fringe pattern. In the preferred embodiment being described with a 4 micron period grating, this corresponds to a spindle movement of 1 micron. The movement would be 2 microns for an 8 micron period grating. The pulse output from the detector 60 is applied to an up-down counter 62, to which the output from the phase detector 61 is also applied. The phase detector 61 determines the direction of movement of the fringe pattern from the inputs applied to it and sets the up-down count mode of the counter 62 accordingly. The output from the counter 62 is fed to a digital display 63 from which the exact position of the end of the spindle 1 relative to the anvil 2 can be read out.

The housing 12 includes a power pack 64, which may suitably be rechargeable batteries, electric circuit elements 65, a switch 66, which controls the supply of power to the circuit arrangement, and the digital display device 63.

In operation, the electric circuits are energised and the counter 62 is set to zero upon the operation of the switch 66. The spindle 1 is then withdrawn from the anvil 2 by sliding the thumb operated button 10 along the slot 11 in the case 12 against the force exerted by the approximately zero rate, spring 14 and the damper 13.

An object to be measured is introduced between the anvil 2 and the spindle 1, the sliding button 10 is released, and the spindle 1 is allowed to return under the influence of the spring 14, towards the anvil 2 until it meets the object which is located against the anvil 2. The spring 14 then exerts a closure force, which is approximately constant over the full operating range of the instrument, due to the zero rate spring 14. The speed of return of the spindle 1 is controlled by the damper 13. The movement of the spindle 1 is indicated during its movement continuously on the display 63 as a result of the interrogation of the fringe pattern produced by radiations from the source 37 passing through the gratings 24 and 28 by the photo-transistors 51 and 52, in the way described above; the counter 62 counting up when the movement of the spindle is in one direction and down when it is in the other direction. The display can easily be read when the object is between the anvil 2 and the spindle 1, or the display can be set to zero by operating the switch 66 when the spindle 1 is on the object to be measured, and then be removing the object and allowing the counter to count back until the closed position of the spindle is reached, a negative indication of the object size can be read from the display. There is thus provided a facility that enables measurements to be made when the display cannot conveniently be read in situ.

In another embodiment in which oil or other fluid is used to space the gratings and provide damping it is particularly convenient to use a circular section grating assembly.

A particular form of such a circular section assembly will now be described with reference to FIGS. 6A, 6B, 7A, 7B and 7C in which there is shown a rod 67 of transparent material, for example glass, which slides, with a small clearance, in a tube 68 of transparent material. When the arrangement is assembled in a gauge, the rod 67 is attached at one end 69 via a coupling joint (not shown) such as that shown at 29 in FIG. 1B to a spindle of a measuring instrument and the tube 68 is attached to the main frame of the instrument. A transparent viscous damping fluid is contained between the rod 67 and the tube 68 and within a bellows unit 70, which serves to seal the assembly. The viscous fluid operates as a damping medium, as the rod 67 moves through the tube 68 in accordance with the movement of the spindle of the measuring instrument. Gratings 71 and 72 are printed on the outside of the rod 67 and the inside of the tube 68 respectively. During the printing of the gratings, the relative angles between the two gratings are so controlled that, on assembly, the fringe pattern between the two gratings has a required period. It would, of course, be possible to print the grating 72 on the outside of the tube 68, although such an arrangement would not be preferred.

As shown particularly in FIG. 6A, light from a lamp 73 is collimated by a lens 74 and passed through one side of the tube 68 and the two gratings 71 and 72. The transparent rod is so chosen that it acts as a lens, which then focusses the light, modulated by the effect of the gratings 71 and 72, on to a detector array indicated at 75. The array 75 includes a pair of photo-transistors 76 and 77, which are indicated more clearly in FIG. 7B.

In order to obtain quadrature signals from the photo-transistors 76 and 77, it is convenient to use a mask 78, as shown in FIG. 7. The rod 67 acts as a cylindrical lens and the mask 78 is required in order to select the fraction of the fringe pattern which is to be focussed on to the respective photo-transistor. Thus an aperture 79 in the mask 78 defines the light that is to be focussed on to the detector 76, whilst an aperture 80 in the mask 78 defines the light that is to be focusses on to the other detector 77.

A method of making a master grating will now be described with reference to FIG. 8. The method employs adaptations of techniques used in the manufacture of solid state semiconductor circuits. A description of the known techniques is given on pages 193–205 of a book entitled "Dividing, Ruling and Mask-Making" by D. F. Horne, published by Adam Hilger, London 1974.

The first step in the method, indicated by block 81 in FIG. 8, is the making of a master. In the particular method, a Rubylith master is employed. A Rubylith master is a plastics laminate material constituted by a base of translucent white material and a strippable coating of ruby coloured material. The master represents a small section of a grating which is 100 times the size of the required grating. In the particular method a pattern is cut in the Rubylith material by means of a programme controlled co-ordinate controlled cutting machine, generally known as a co-ordinatograph. The master comprises a sheet of Rubylith material which is 35 cm long and 4 cm wide. 100 lines, each extending in the direction of the length of the material, are cut across its width with a 400 micron spacing between the lines.

The master is then photographed with a high degree of accuracy and reduced in size by a factor of 10, as indicated by block 82. The negative which is so produced is commonly referred to as a reticle plate.

The reticle plate is then placed, as indicated by block 83, in a known step and repeat camera, for example of the type described on pages 200–205 of the book by D. F. Horne referred to above, and photographically reduced in size by a further factor of 10 on to a part of a final master plate, which may be a photographic plate or a photo-resist coated chromium plate. The relative positions of the reticle plate and the final master plate in the step and repeat camera are then changed so that an image of the reticle plate is obtained at a very accurate interval along the master plate from the first image and an image of the reticle plate is again photographically produced on an adjacent part of the final master plate reduced by a factor of 10. The process is repeated until a photographic image is produced on the final master plate of a grating of the required length. The image is then developed, as indicated by block 84, and the grating on the final master grating can then be used in the making of line and space gratings on glass blocks, as described with reference to FIGS. 2A, 2B and 2C.

Although the invention has been described with reference to particular embodiments, it will be understood that variations and modifications can be made within the scope of the invention claimed.

For example the sliding spindle 1 could be caused to slide in the bearings 7 and 8 by the rotation of an associated knob or wheel, even though the spindle itself does not rotate.

It will also be appreciated that other faces of the glass block 23, for example the bevelled surface, than those referred to can have a coating of lubricating material applied to it.

It will also be understood that the spacer rails 44 and 45 on the surfaces 25 and 26 of the blocks 23 and 27 could be replaced by a continuous rail on one of the surfaces and a series of separate regions of lubricant material, for example dots, on the other surface. Furthermore, the lubricant material on one of the surfaces need not be the same as the lubricant material with which it co-operates on the other surface.

In order to give good adhesion between the surfaces 25, 26 and the lubricant material, the lubricant material is applied in particulate form, for example by spraying or vacuum deposition and not by causing a preformed body to adhere to either of the surfaces.

We claim:

1. A digital read-out measuring instrument including
   A. A source of electromagnetic radiations of the speed of light,
   B. a first measuring member,
   C. a second measuring member having a measuring head and spaced therefrom and in alignment therewith two spaced bearing members, the first measuring member being slidably carried in the respective bearing members at aligned positions for axial movement towards and away from said measuring head when effecting a measuring operation,
   D. a first measurement-providing member of a material which transmits said electromagnetic radiations, aligned axially with said first measuring member and disposed remotely from said measuring head, and having first and second longitudinal surface portions disposed at a given angle relative to one another,
   E. a universal-joint coupling means connecting said first measuring member and first measurement-providing member for ensuring simultaneous axial movement of those members towards and away from said measuring head when effecting a measuring operation,
   F. a second measurement-providing member of a material which transmits said electromagnetic radiations, secured to said second measuring member remotely from said measuring head for close cooperation with said first measurement-providing member, and having third and fourth longitudinal surface portions disposed at said given angle relative to one another for cooperation closely with said first and second surface portions respectively,
   G. spacing means disposed between opposing ones of said surface portions and comprising thin coatings of a low-friction material applied to at least part of at least one of said surface portions in each pair of opposing surface portions,
   H. first spring biasing means urging said first and second measurement-providing members towards one another in a sense such as to compress said spacing means between them and thereby hold said first and third surface portions in closely-spaced, face to face relationship,
   I. first and second diffraction gratings provided on said first and third surface portions respectively so that interference fringe patterns are produced by light or other electromagnetic radiations passing successively between the two gratings,
   J. means to detect radiations from said source, said source being so arranged that radiations emitted by said source are directed successively through the respective gratings, and said detector means being arranged to detect the interference fringe pattern resulting from the transmission or radiation through the gratings and to provide a pulse output according to changes in the said fringe pattern,
   K. a pulse counter connected to the output of said detector means, and
   L. digital display means connected to the output of said counter for displaying in response thereto a measurement indicative of the position of said first measuring member relative to said second measuring member.

2. A digital read-out measuring instrument according to claim 1, wherein said firt measurement-providing member has a cross-section, transverse to the direction of movement of said first measuring member, which is substantially rectangular, and said second measurement-providing member has a said transverse cross-section that is substantially L-shaped.

3. A digital read-out measuring instrument according to claim 2, wherein said second measurement-providing member comprises an assembly of two prisms secured together with an edge face of one adjoining a part of a side face of the other so as to form said member of L-shaped cross-section.

4. A digital read-out measuring instrument according to claim 1, including a second spring biasing means connected with said first measuring member at a position thereon between said bearing members and also with said second measuring member, and urging said first measuring member towards said measuring head, said second spring biasing means having a very low spring rate.

5. A digital read-out measuring instrument according to claim 4, wherein said second spring biasing means comprises a helical coil spring having end parts secured on said first measuring member and on said bearing member which is remote from said measuring head, in such manner that the coil spring is held flexed in the form of an arc.

6. A digital read-out measuring instrument according to claim 4, wherein a viscous damping device is coupled to said first measuring member at a position thereon between said bearing members and to said second measuring member, and operates to limit the rate of travel of said first measuring member relative to said second measuring member.

7. A digital read-out measuring instrument according to claim 4, and further including
   A. a manually-operable retraction member connected to said first measuring member at a position thereon between said bearing members for enabling said first measuring member to be retracted against the action of said second spring biasing means, and
   B. a casing secured to said second measuring member and enclosing at least said bearing members, said first and second measurement-providing members, said radiation source and said radiation detector means, said retraction member projecting externally of said casing through an aperture formed therein.

8. A digital read-out measuring instrument according to claim 1, wherein said universal joint coupling means comprises
   A. a coupling pin having conically-shaped ends engaging in sockets formed respectively in said first measuring member and said first measurement-providing member, and
   B. tension spring means coupling those members axially together so as to maintain said coupling pin in compression therebetween, said ends and sockets being shaped to allow small transverse displacements of said first measuring and measurement-providing members relative to one another.

* * * * *

UNITED STATES PATENT AND TRADEMARK OFFICE
CERTIFICATE OF CORRECTION

PATENT NO. : 4,215,480
DATED : August 5, 1980
INVENTOR(S) : John H. Fisher, John D. Bradbrook, Peter J. Bassett It is certified that error appears in the above-identified patent and that said Letters Patent are hereby corrected as shown below:

Col. 1, Line 65, change "features" to --feature--.

Col. 3, Line 60, after "30", insert --which together constitute the second of the two measurement-providing members--.

Col. 5, Line 3, change "surfaces" to --surface--.

Col. 5, Line 36, change "smilar" to --similar--.

Col. 6, Line 20, change "ageing" to --aging--.

Col. 7, Line 11, change "be" to --by--.

Col. 7, Line 63, change "focusses" to --focussed--.

Claim 1, Par. J, Line 55, change "or" to --of--.

Claim 1, Par. K, Line 58, after "counter", add a comma --,--.

Claim 2, Line 2, change "firt" to --first--.

Signed and Sealed this

Twentieth Day of October 1981

[SEAL]

Attest:

GERALD J. MOSSINGHOFF

Attesting Officer   Commissioner of Patents and Trademarks